C. H. KNIGHT.
RECREATION TOWER.
APPLICATION FILED APR. 17, 1911.

1,039,545.

Patented Sept. 24, 1912.
7 SHEETS—SHEET 1.

WITNESSES:
H. J. Gettins
H. L. McDonnell

INVENTOR
Claude H. Knight
BY
Lynch & Dorr
his ATTORNEYS

C. H. KNIGHT.
RECREATION TOWER.
APPLICATION FILED APR. 17, 1911.

1,039,545.

Patented Sept. 24, 1912.

7 SHEETS—SHEET 2.

C. H. KNIGHT.
RECREATION TOWER.
APPLICATION FILED APR. 17, 1911.

1,039,545.

Patented Sept. 24, 1912.
7 SHEETS—SHEET 3.

WITNESSES:

INVENTOR.
Claude H Knight
BY Lynch & Dore
his ATTORNEYS.

C. H. KNIGHT.
RECREATION TOWER.
APPLICATION FILED APR. 17, 1911.

1,039,545.

Patented Sept. 24, 1912

7 SHEETS—SHEET 4.

WITNESSES:

INVENTOR.
Claude H. Knight
BY
his ATTORNEYS.

C. H. KNIGHT.
RECREATION TOWER.
APPLICATION FILED APR. 17, 1911.

1,039,545.

Patented Sept. 24, 1912.

7 SHEETS—SHEET 5.

WITNESSES:
H. J. Gittins
N. L. McDonnell

INVENTOR.
Claude H. Knight
BY Lynch & Doer
his ATTORNEYS.

C. H. KNIGHT.
RECREATION TOWER.
APPLICATION FILED APR. 17, 1911.
1,039,545.
Patented Sept. 24, 1912.
7 SHEETS—SHEET 6.
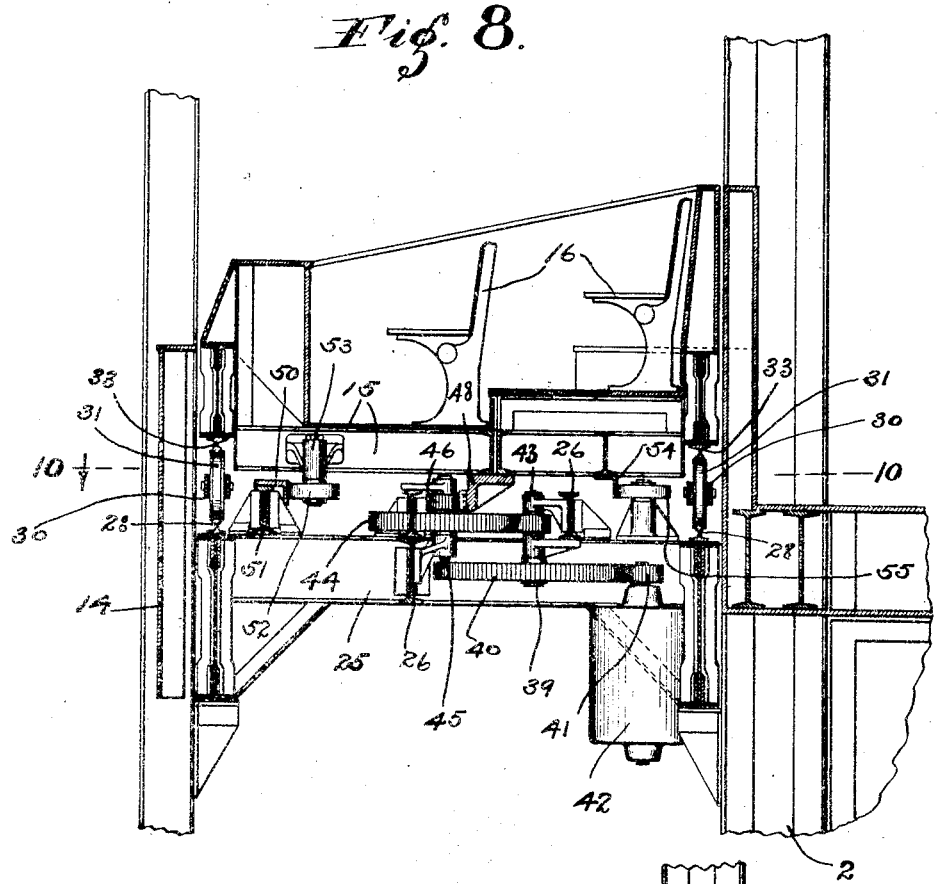
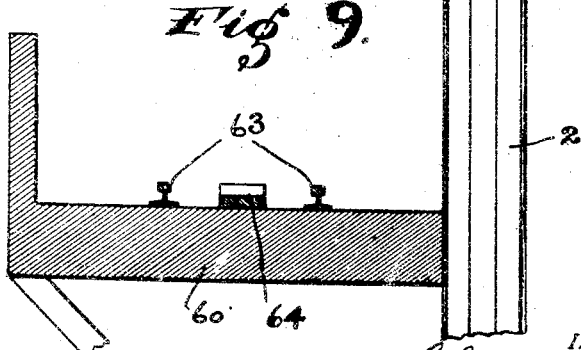
WITNESSES:
INVENTOR.
Claude H. Knight
BY Lynch & Orr
his ATTORNEYS.

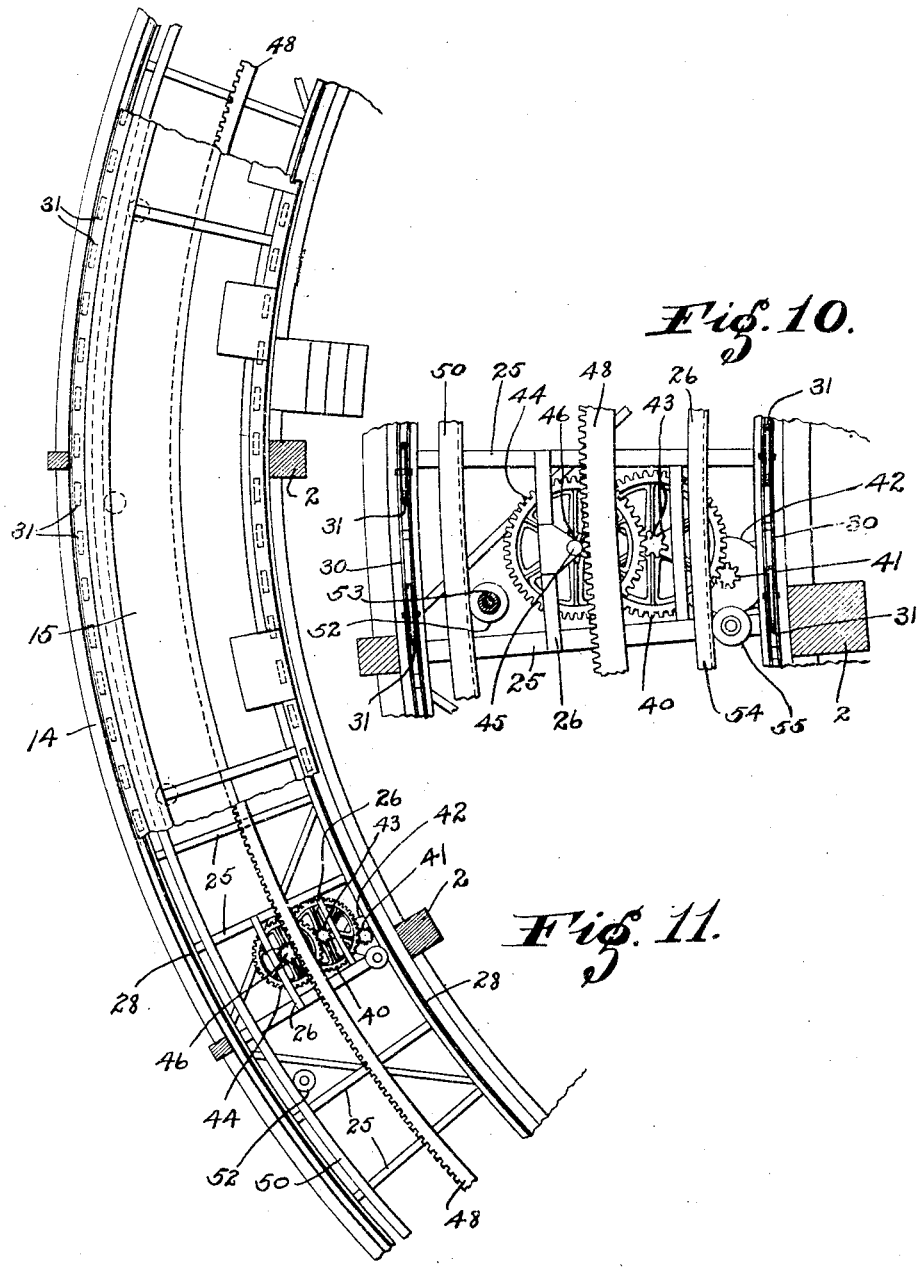

UNITED STATES PATENT OFFICE.

CLAUDE H. KNIGHT, OF CLEVELAND, OHIO.

RECREATION-TOWER.

1,039,545.   Specification of Letters Patent.   Patented Sept. 24, 1912.

Application filed April 17, 1911. Serial No. 621,467.

*To all whom it may concern:*

Be it known that I, CLAUDE H. KNIGHT, a citizen of the United States of America, residing at Cleveland, in the county of Cuyahoga and State of Ohio, have invented certain new and useful Improvements in Recreation-Towers; and I hereby declare the following to be a full, clear, and exact description of the invention, such as will enable others skilled in the art to which it pertains to make and use the same.

This invention relates to new and useful improvements in structures and particularly to recreation towers for amusement parks.

The object of this invention is to provide a structure of this character which will be very strong, free from perceptible vibration and capable of withstanding heavy wind pressure.

A further object of my invention is to provide new and improved means of communication between the base and top of the tower which will serve both for conveying sightseers and patrons to the top of the tower and will also serve as a means of recreation in the form of a carousel for those wishing the excitement and exhilaration of the ride.

My invention, therefore, consists in the features of construction and combination of parts hereinafter described in the specification, pointed out in the claims and illustrated in the accompanying drawings.

Figure 1:
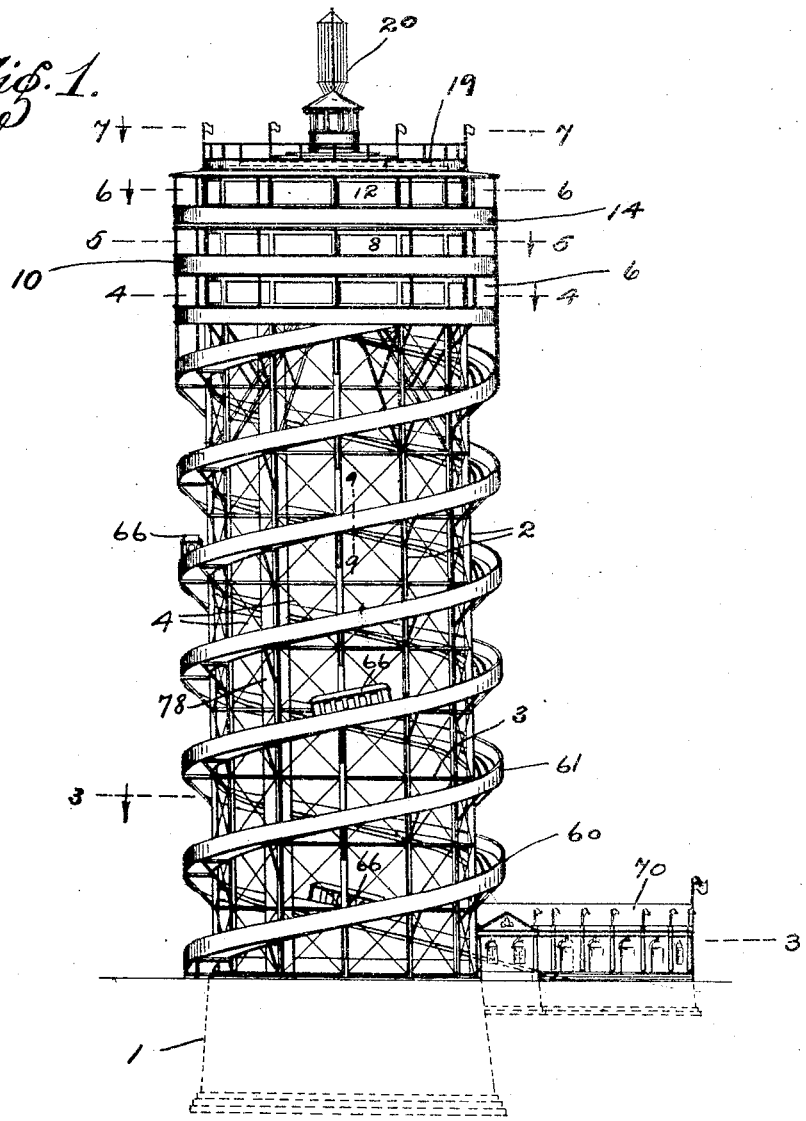
Figure 2:
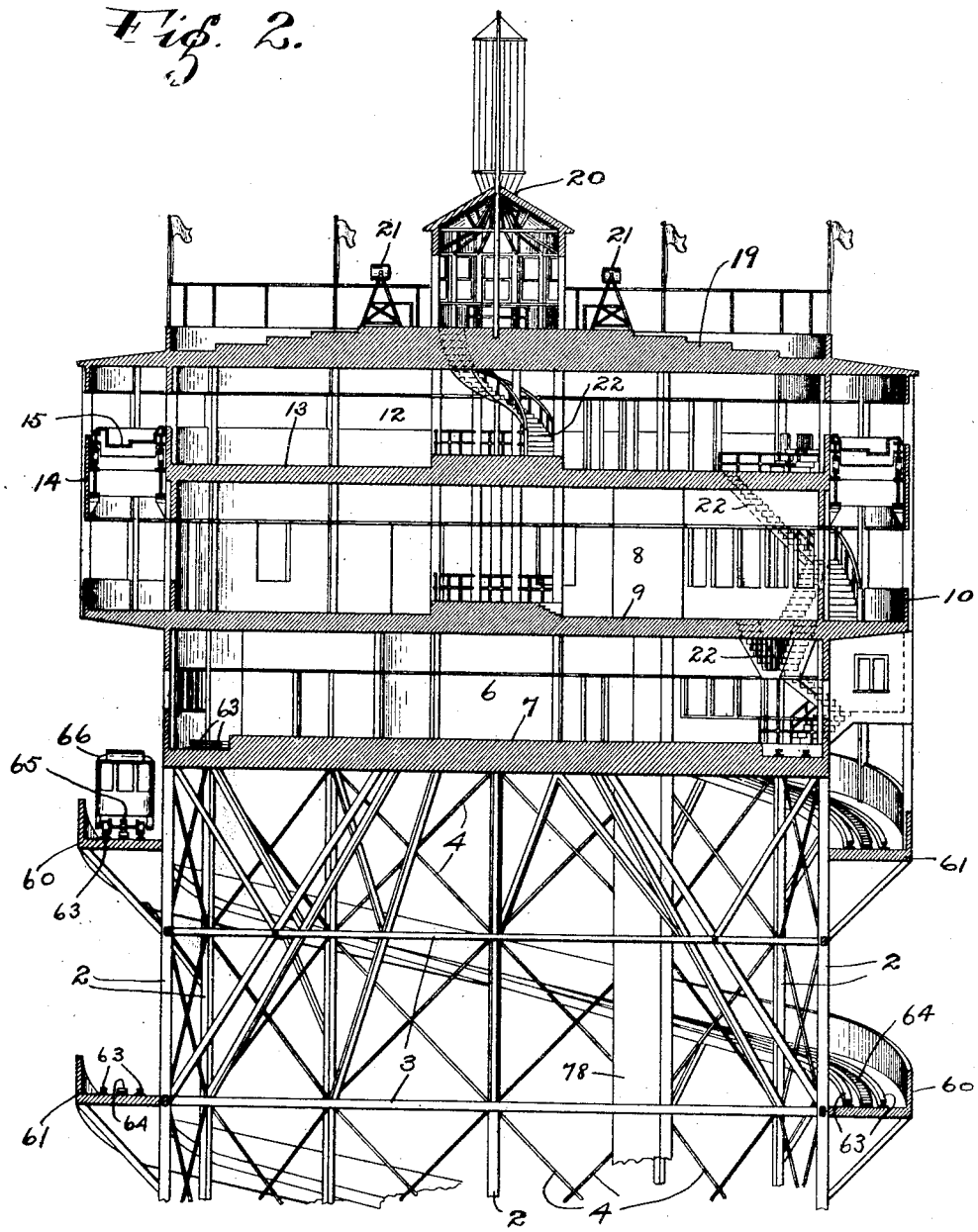
Figure 3:
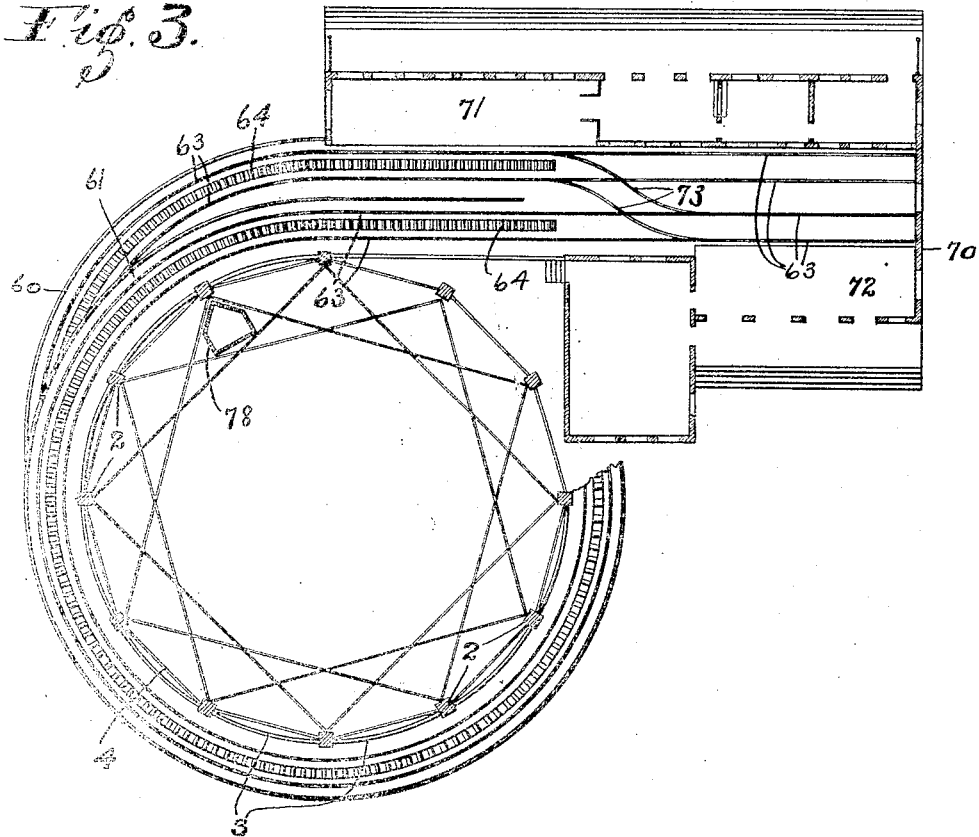
Figure 4:
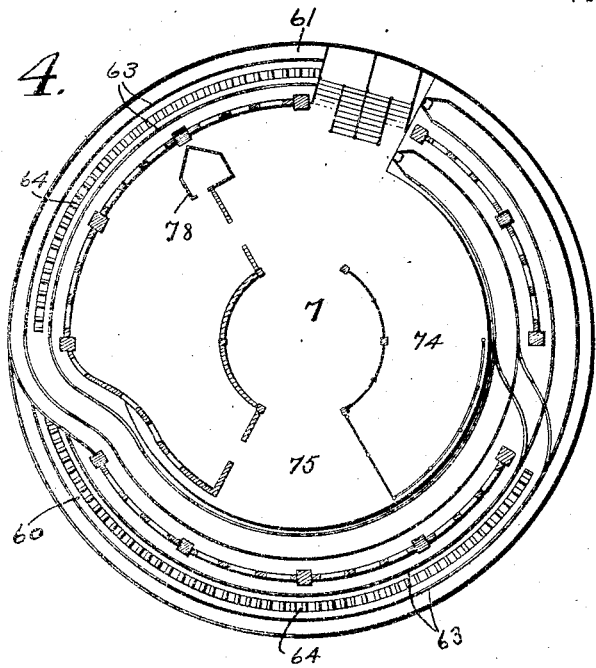
Figure 5:
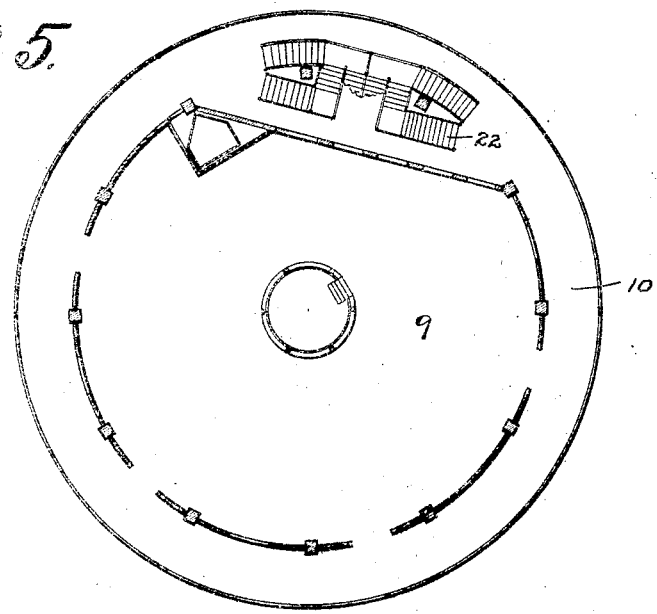
Figure 6:
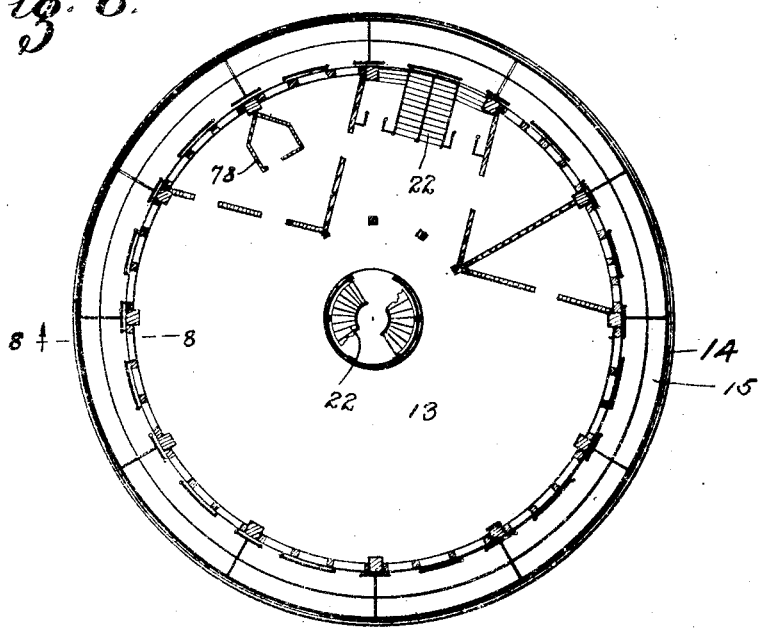
Figure 7:
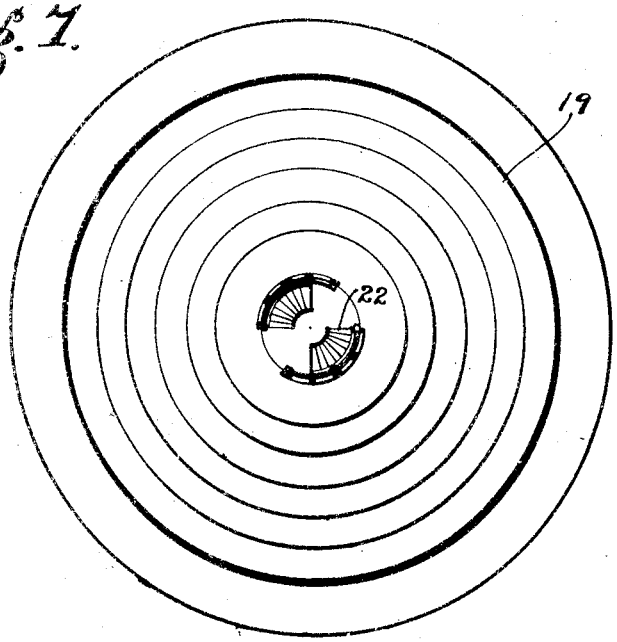

Referring to the accompanying drawings Figure 1 is an elevation of a structure embodying my invention. Fig. 2 is a central vertical section of the same. Fig. 3 is a section on line 3—3, Fig. 1. Fig. 4 is a section on line 4—4, Fig. 1. Fig. 5 is a section on line 5—5, Fig. 1. Fig. 6 is a section on line 6—6, Fig. 1. Fig. 7 is a section on line 7—7, Fig. 1. Fig. 8 is a section on line 8—8, Fig. 6. Fig. 9 is an enlarged vertical section through one of the spiral balconies corresponding to line 9—9, Fig. 1. Fig. 10 is a section on line 10—10, Fig. 8. Fig. 11 is a top plan of a portion of the movable balcony partly in section.

In general my invention contemplates the provision of an open frame or sub-structure of structural steel and iron which can be made any desired height, and at the top of the frame or sub-structure is arranged the main structure in the form of an inclosed pavilion, preferably three stories in height. The pavilion is provided with a promenade balcony and with an observation balcony. The floor of the observation balcony is mounted so that it can be revolved around the main structure, and the floor is provided with tiers of seats for the observers. On the roof of the pavilion is arranged a wireless telegraph station and the remainder of the space on the roof is arranged so that it can be utilized as a roof garden. Around the outside of the sub-structure, and extending from the base thereof to the pavilion or main structure, are arranged two spiral runways corresponding to the arrangement of the spiral threads on a double threaded screw. The runway serves to brace the entire sub-structure and also forms the foundation for a track for cars on which the ascent or descent from the main structure is made. One spiral runway is designed for the cars going up to the top and the other spiral runway is designed for the cars coming down. At the base of the tower is a building suitable for the general offices and also as a station.

Referring now particularly to the drawings, and especially to Figs. 1 and 2, 1 indicates the foundation of the sub-structure which is preferably made of concrete. The sub-structure is composed of vertically arranged structural members 2, brace bars 3, and an inner lacing of tie rods 4 which bind together and reinforce the structural members. The main structure is mounted and secured on top of the sub-structure and the construction thereof is in all respects similar to the usual structural iron building. The said main structure resembles a three story building and has a lower story 6 (shown in plan in Fig. 4) which has a solid floor 7, of concrete or other suitable material, and this story may be termed the landing-story. Above the landing-story is an intermediate story 8 (shown in plan in Fig. 5) which also has a solid floor 9 and is provided with an over-hanging balcony 10. This story is designed for use as a dance hall, and the balcony may be used as a promenade. Above the intermediate story is arranged the top story (shown in plan in Fig. 6) which has a solid floor 13, and the said story is provided with a balcony 14 which has a movable floor 15 and beneath the said movable floor 15 is provided suitable mechanism for driving the floor so that it will rotate around the main structure. The movable floor 15 is preferably built with sections one above the other and thereon are mounted stationary seats or benches 16. The main structure is provided with a roof 19 and at the center thereof is constructed a wireless telegraph station 20. On the roof is also mounted a series of searchlights 21. The roof is designed to be utilized for recreation purposes after the manner of the usual roof garden. All the stories and the roof are preferably provided with communicating stairways, shown at 22.

The movable floor of the observation balcony is mounted and driven as follows:—From the structural members 2 horizontally arranged structural members 25 extend out radially and the outer ends thereof are secured to the columns of the balcony, and between the structural members 25 are arranged cross-beams 26. A pair of circular rails 28 are mounted on the said structural members 25, one of the said rails being adjacent to the structural members 2 and the other rail being adjacent to the balcony columns. On each rail 25 is mounted a circular cage 30 in which are journaled rollers 31 so as to have traction on the said rails. On the under side of the movable floor, immediately above the pair of rails 28 are mounted a pair of circular rails 33 which are adapted to be received by the flanges on the said rollers 31. From one of the beams 26 is rotatably hung a shaft 39 and on the lower end of the said shaft 39 is secured a large gear wheel 40, and the said gear wheel 40 is arranged to mesh with a pinion 41 on the driving shaft of the electric motor 42 which is rigidly secured to the structural members of the main structure. On the shaft 39 at the upper end thereof is rigidly secured a small pinion 43 which meshes with a larger gear 44 secured on a shaft 45 which is operatively supported from a beam 26 and on the said shaft 45 is also secured a pinion 46. The said pinion 46 is arranged to engage with the teeth of a circular rack 48 which is secured about centrally to the under side of the floor of the movable balcony. Now, therefore, when the motor is operated the floor will be rotated around the main structure through the before described gearing. In order to guard against any lateral shifting of the floor a circular vertically arranged track 50 is rigidly supported on the structural members 25 and a series of rollers 52 are hung from brackets 53 on the under side of the floor of the balcony, and the said rollers 52 are adapted to engage and travel over the surface of the said track 50, and also on the under side of the floor of the balcony is secured a circular track 54 and on the structural members 25 are mounted rollers 55 which engage said circular rail 54 and therefore the said floor is held against horizontal or lateral movement while it is being revolved.

The spiral runways, as before mentioned, are arranged after the manner of a double thread on a screw, the going up runway is indicated at 60, and the coming down runway is indicated at 61. Both runways after they leave the base of the tower are everywhere an equal distance apart and are rigidly connected with the sub-structure. By the provision of the two independent runways all danger of collision between conveyances going in opposite directions is averted, and also the whole structure is evenly balanced and greatly reinforced. The said runways form a binding for the entire sub-structure, greatly increasing the resistance of the sub-structure to crushing or compressing strains, and also giving added resistance to the structure against wind pressure. On each of the runways is mounted a track 63 and between the rails of the said tracks on each runway is arranged a rack 64 which is adapted to be engaged by a cog 65 carried by a car 66 which is adapted to have traction on the said rails. The cars 66 are preferably driven by electricity, but any motive power desired may be used. The tracks after they leave the runways at the base of the structure extend within the station building 70, as shown in Fig. 3, and in the station building a waiting room 71 and an exit room 72 are provided at opposite sides of the tracks to accommodate the passengers taking or leaving the cars. A switch 73 is also provided by which the cars may be shifted from the down track to the up track as desired. The tracks are also continued on the landing floor 7 of the main structure and separate rooms or compartments 74 and 75 are provided to receive the incoming and outgoing passengers. The spiral tracks, together with the cars thereon, are provided not only as a means of communication between the base of the substructure and the main structure, but are also designed for a recreation device. The cars going up and cars coming down being on separate spirals will only pass each other on opposite sides of the structure so that the views from the cars going in one direction will never be cut off by cars going in the opposite direction, and also all the noise and clatter occasioned by cars passing close to one another and the accompanying unpleasant sensation will be entirely avoided.

The observation balcony will afford not only a very enjoyable resting place from which all sections of the surrounding country can be viewed while the balcony is being rotated, but it is also purposed to provide field glasses or telescopes which will be permanently secured to supports, and at night in conjunction with the flashlights will enable all points of interest within a large radius to be clearly discerned.

In order to provide an auxiliary means of communication between the base of the tower and the main structure an elevator shaft 78 is provided.

What I claim is,—

1. In a recreation tower, the combination of a sub-structure consisting of an open frame circular in cross section, an inclosed structure mounted at the top of said sub-structure and a pair of concentric spiral runways supported externally on said sub-structure and encircling the same.

2. In a recreation tower, the combination of a sub-structure consisting of an open frame circular in cross section, a main structure mounted at the top of said sub-structure, a balcony arranged around the main structure and secured thereto, said balcony being provided with a movable floor, a circular rack mounted on the under side of said floor, a series of gear wheels mounted to mesh with said rack, a series of electric motors mounted on the sub-structure and means operatively connecting said motors with the said gears so that the operation of said motors will cause the said floor to rotate around the main structure.

3. In a recreation tower, the combination of a sub-structure consisting of an open frame circular in cross section, a main structure mounted at the top of said sub-structure and consisting of a pavilion comprising three stories, a pair of concentric spiral runways supported externally on said sub-structure and encircling the same and extending from the base of said structure to the first floor of the main structure and tracks for cars arranged on said runways.

4. In a recreation tower, the combination of a sub-structure consisting of an open frame circular in cross-section, a main structure mounted on said sub-structure at the top thereof and consisting of a three story pavilion, a pair of concentric parallel spiral runways supported externally on said sub-structure and encircling the same and extending from the base of said sub-structure to the first story of the main structure, said runways terminating at their lower ends in a passenger station, tracks extending from said station up both runways and along the floor of the first story of the main structure and means for shifting cars from one track to the other track in the said station and from one track to the other track on the floor of the pavilion.

In testimony whereof, I sign the foregoing specification, in the presence of two witnesses.

CLAUDE H. KNIGHT.

Witnesses:
VICTOR C. LYNCH,
N. L. McDONNELL.